Figure 1:
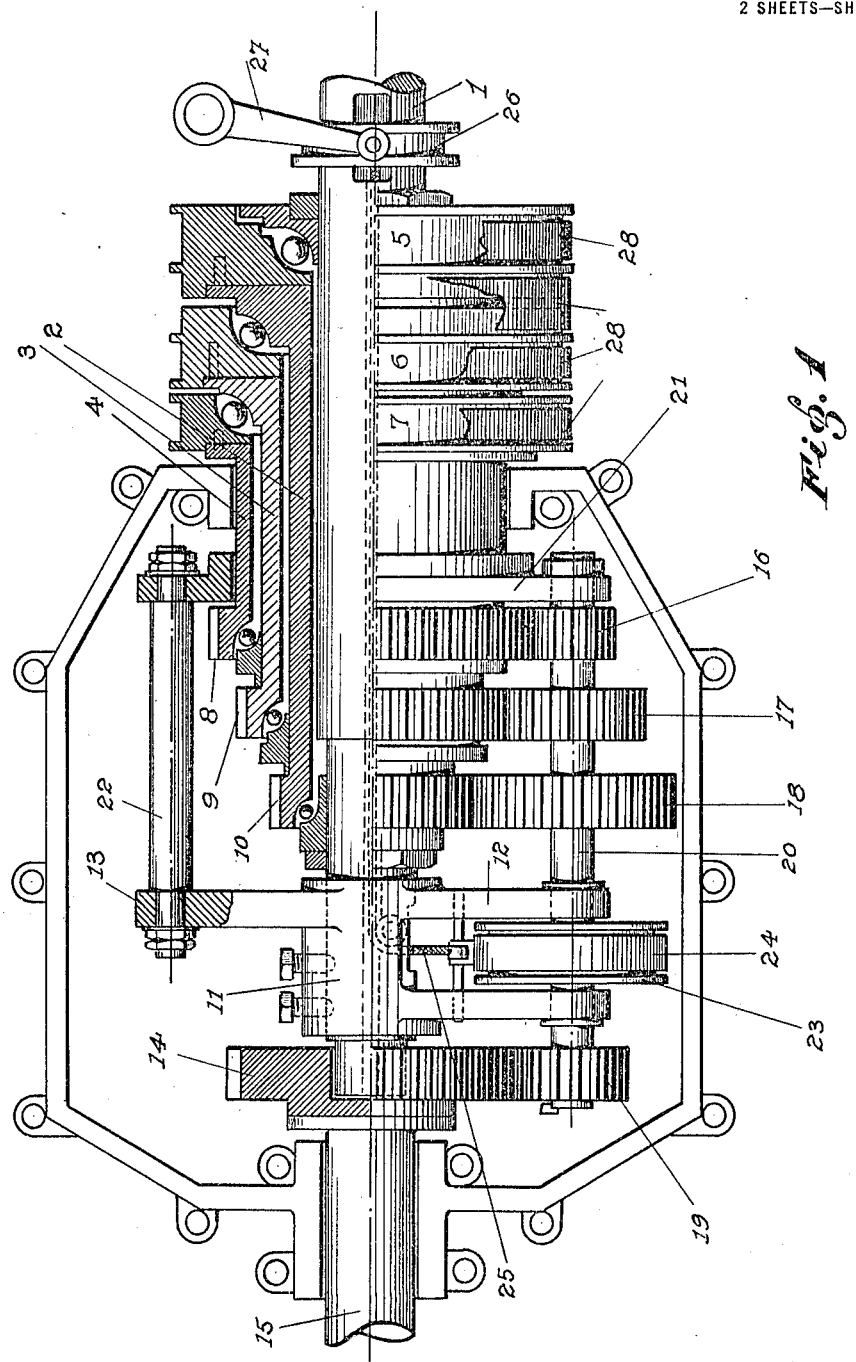

T. VOLPE.
CHANGE SPEED GEAR.
APPLICATION FILED APR. 7, 1917.

1,292,384.

Patented Jan. 21, 1919.
2 SHEETS—SHEET 1.

INVENTOR:
TOMMASO VOLPE
BY: H. van Oldenveel
ATTORNEY

T. VOLPE.
CHANGE SPEED GEAR.
APPLICATION FILED APR. 7, 1917.
1,292,384.
Patented Jan. 21, 1919.
2 SHEETS—SHEET 2.
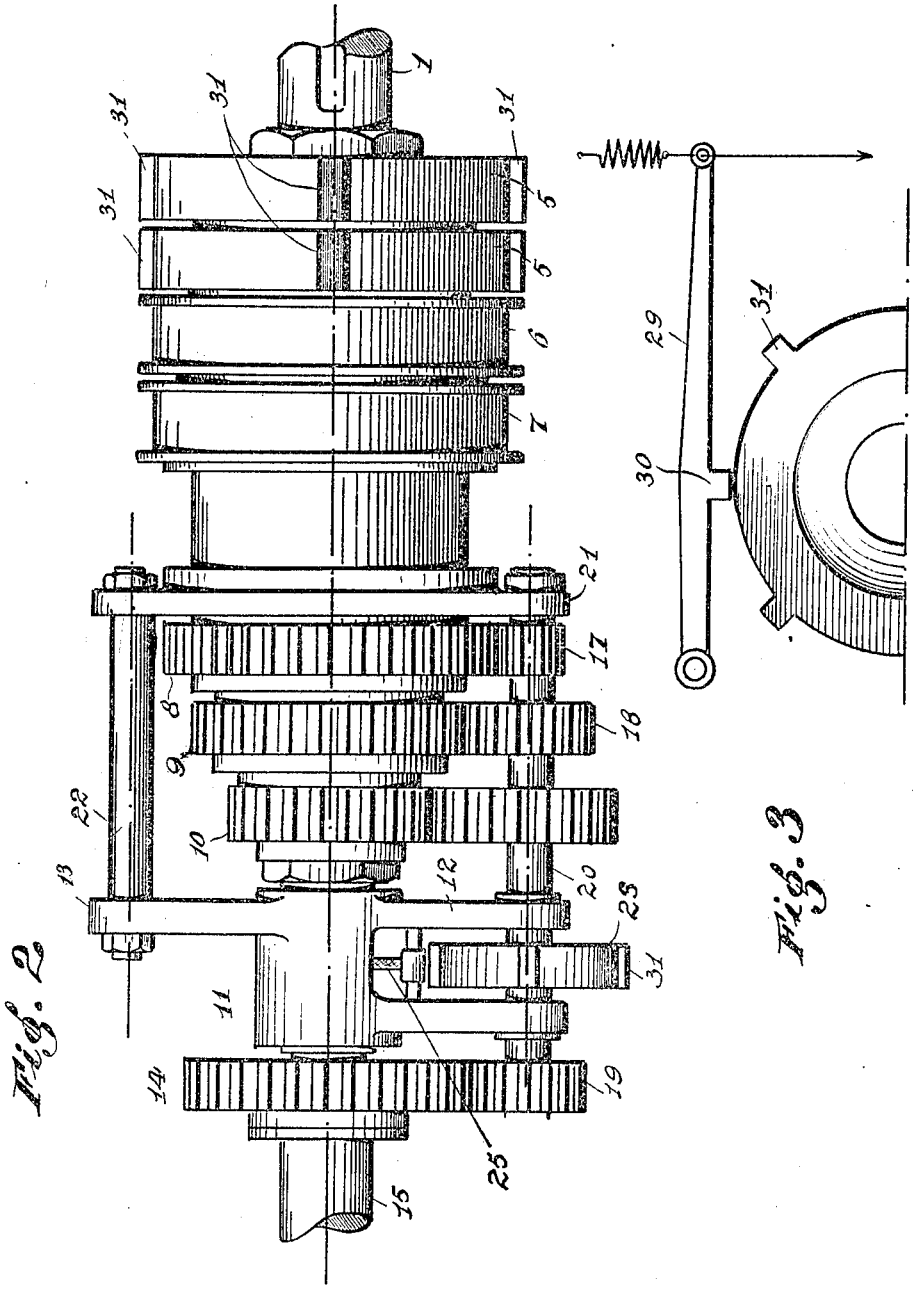
INVENTOR:
TOMMASO VOLPE
ATTORNEY

UNITED STATES PATENT OFFICE.

TOMMASO VOLPE, OF SAPRI, ITALY.

CHANGE-SPEED GEAR.

1,292,384.      Specification of Letters Patent.      Patented Jan. 21, 1919.

Application filed April 7, 1917. Serial No. 160,510.

*To all whom it may concern:*

Be it known that I, TOMMASO VOLPE, a subject of the King of Italy, and residing at Sapri, Province of Salerno, Italy, have invented certain new and useful Improvements in Change-Speed Gears, of which the following is a specification.

The invention refers to a change speed gear for transmitting a rotary motion from a driving to a driven shaft and although it is applicable to any type of mechanism capable to transmit a rotary motion, it is intended more particularly to provide a change speed gear adapted to be used on motor cars in the place of the ordinary change speed gears.

The invention eliminates completely the friction clutch and avoids all those complicated operations which are now necessary to pass from one speed to another, and as the gears are in constant mesh between them, the wear is quite insignificant and the whole mechanism works softly and silently.

The invention is shown, by way of example, in the annexed drawings, in which—

Figure 1 is a part sectional vertical elevation of a change speed gear for motor cars with three forward and one backward drive, Fig. 2 is a similar view showing a modified construction of the drum locking device, Fig. 3 shows one of the locking drums in combination with a quick stoppage lever.

In the drawing, 1 indicates the driving shaft which may be a prolongation of, or be connected with, the engine shaft. Three sleeves 2, 3 and 4 surround the shaft 1 and one another coaxially and carry each on their forward end outside the gear box or housing a grooved drum 5, 6, or 7 respectively made in one piece with the respective sleeve, and on their rear ends inside the box or housing a toothed crown wheel 8, 9, 10 respectively.

The diameter of each crown wheel is proportionate to the diameter of the respective sleeve and these wheels form thus a series of gears of gradually decreasing proportions from a largest gear on the outer sleeve 4 to a smallest gear on the inner sleeve 2. The three sleeves 2, 3, 4, the three gears 8, 9, 10 and the three drums 5, 6, 7 are mounted on the shaft 1 with interposed ball bearings and are all free to rotate about shaft 1 and one about the other.

The shaft 1 has fastened on it inside the gear housing a sleeve 11 made in one piece with a fork 12 and with an arm 13 which are diametrically opposed between them and follow the rotation of the shaft 1.

The free end of this shaft is mounted in a bearing provided in the center part of a gear 14 which is made in one piece with the driven shaft 15 which is in line with the shaft 1.

The gears 8, 9, 10 and 14 are in constant mesh with the four gears 16, 17, 18 and 19 made out of one piece of metal and interconnected by a common shaft 20 supported in bearings on the ends of the fork 12 and of a collar 21, which latter is free to rotate about the sleeve 4. The arm 13 holds the collar 21, the fork 12 and the gears on the shaft 20 rigidly together by aid of a bolt 22.

The shaft 20 has secured on it a drum 23 which has winding onto it a band brake 24 adapted to be operated through a metal rod 25. This rod 25 passes through the hollow center part of the shaft 1 and engages a ring 26 arranged to be moved along the shaft 1 by aid of a lever 27.

Each drum 5, 6, 7 has a band brake 28 wound round it and these band brakes may be operated separately or in pairs by means of a lever or foot control gear.

The working of this new change speed gear is as follows:

Supposing the driving shaft rotates and the drums 5, 6, 7 are left free or not acted on by the brakes 28, when the rotation of the shaft 1 transmitted to the fork 12, causes the gears 16, 17, 18 and 19 to roll round the respective gears 8, 9, 10, 14.

The gear 14 offers resistance to the rotary motion on account of the force required to advance the car, the said gear being made in one piece with the shaft 15 which transmits the rotation to the rear wheels.

The gear 19 is thus caused to roll round the gear 14 and the gears 16, 17, 18 rolling round the gears 8, 9, 10 are hereby caused to rotate at different speeds together with the drums 5, 6, 7, these speeds being the resultants of the combination of the rotary motion and the rolling movement of the gears 16, 17, 18 round the gears 8, 9, 10 and of the ratio between the diameter of the gears forming each couple.

In this case, the change speed gear is in its neuter position.

To obtain the first speed, the brake of the drum 6 is made to act on the said disk, whereby the gear 9 is locked and the gear 17 caused to roll round the gear 9. As the resistance to rotation is greater on gear 9 than on gear 14, this latter gear starts rotating at a speed which is the resultant of the combination of the speed of rotation of the driving shaft 1 and the speed which issues from the rolling movement of the gear 17 round the gear 9 and of the gear 19 round the gear 14, and is also proportionate to the diameter of the two pair of gears.

The two intermediate or second and third speeds are obtained by locking respectively the drums 5, 6 or the drum 5 only.

The fourth speed or through drive is obtained through locking the gear 19 and letting the drums 5, 6, 7 free. The gear 19 is locked by aid of the brake 24 which is operated through the ring 26 being moved along the shaft. The gear 19 is then prevented from rolling round the gear 14, which latter is thus caused to rotate at the speed of the driving shaft.

The backward drive is obtained through locking the drum 7 and the gear 8, when the gear 16 will roll round the gear 8 and the resultant rotation is transmitted to the gear 14 by aid of the gear 19. As the diameter of the gear 8 is larger than the diameter of the gear 14, this latter gear is rotated at a speed and in a direction which are the result of the speed obtained through the rolling movement of the gear 16 round the gear 8 and of the rotation of the gear 19 which rolls round the gear 14.

The gear 14 then rotates in opposite direction respecting the shaft 1 and its speed of rotation is proportionate to the difference between the diameters of the gears 14 and 8 and the diameters of the gears 16 and 19.

Fig. 2 shows a modified construction of the drum locking device.

The first speed and the backward drive gears are also here provided with band brakes which are required for the gradual transmission of the rotation, while the drums which control the higher speeds, viz. the second and third speed and the through drive, have the band brakes replaced by levers 29 which by aid of a tooth 30 engaging a tooth 31 on the rim of the respective drum, lock the drum and thus change the speed. This arrangement is intended to prevent a skidding of the brakes when they are greased, and an ignition of the grease where the brakes are arranged in lubrication boxes.

What I claim is:

1. In a change-speed gear, a driving shaft, a plurality of sleeves coaxially surrounding and each rotatable relatively to that shaft, each said sleeve carrying a gear-wheel, a frame secured to and rotatable with the driving shaft, a shaft carried by said frame, gears all mounted on said shaft and meshing each with one only of the gear-wheels before mentioned, and a brake for the last-mentioned shaft, all in combination with a driven shaft operably connected with the aforesaid shaft carried by the frame, and with means for operating the brake.

2. In a change-speed gear, a driving shaft, a plurality of gear-wheels each surrounding and each rotatable relatively to that shaft, a frame secured to and rotatable with the driving shaft, a shaft carried by said frame, gears all mounted on said shaft and meshing each with one only of the gear-wheels before mentioned, a brake for the last-mentioned shaft, and means for controlling the brake, all in combination with a driven shaft operably connected with the aforesaid shaft carried by the frame.

3. In a change-speed gear, a driving shaft, a plurality of sleeves coaxially surrounding and each rotatable relatively to that shaft, each said sleeve carrying a drum at one end and a gear-wheel at the other end, a frame secured to and rotatable with the driving shaft, a shaft carried by said frame, gears all mounted on said shaft and meshing each with one only of the gear-wheels before mentioned, a brake for the last mentioned shaft, and flexible means passing lengthwise through the driving shaft for controlling the brake, all in combination with a driven shaft provided with a gear in mesh with the aforesaid pinion.

In testimony whereof I have signed my name, in the presence of two subscribing witnesses.

TOMMASO VOLPE.

Witnesses:
INIOLO GUOCINI,
WILLIAM GARZINLO.

Copies of this patent may be obtained for five cents each, by addressing the "Commissioner of Patents, Washington, D. C."